May 10, 1938.    F. H. McLAIN    2,116,729

CLOTHESLINE HOOK

Filed Feb. 20, 1937

Inventor:
F. H. McLain,
by Frank S. Appleman
his Attorney.

Patented May 10, 1938

2,116,729

UNITED STATES PATENT OFFICE 2,116,729

CLOTHESLINE HOOK

Fremont H. McLain, Wellsville, Ohio

Application February 20, 1937, Serial No. 126,897

1 Claim. (Cl. 24—131)

This invention relates to a clothesline hook to be secured in an appropriate fixed manner to posts, buildings and the like, an object being to provide hooks for the above purpose to which clotheslines may be expeditiously anchored or hitched to provide taut reaches or lengths with provisions for eliminating slippage or sagging of the clothesline when subjected to heavy pulls or strains, the hitching or tying of the line requiring but one hand.

A further object of the invention is to provide in the hooks means whereby should the line break between two or more stretches or lengths, the rest of the line will remain locked against slipping.

The clothesline hooks are preferably formed of rounded spring wire of heavy gauge which may be shaped or bent at desired angle and loops for accomplishing the results above stated.

With the foregoing and other objects in view, the invention consists in the details of construction, and in the arrangement and combination of parts to be hereinafter more fully set forth and claimed.

In describing the invention in detail, reference will be had to the accompanying drawing forming part of this appplication, wherein like characters denote corresponding parts in the several views, and in which—

Figure 1:
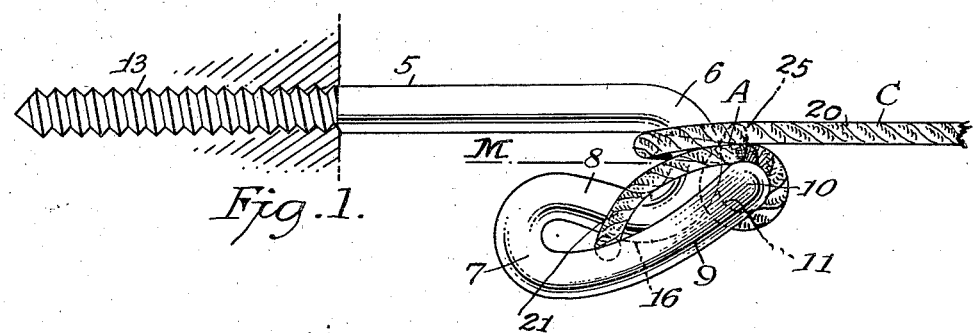
Figure 1 illustrates a plan view of the improved clothesline hook showing it provided with an extended threaded shank to attach it to a wooden post or other anchorage.

Some or all of the above described views may show the mode of hitching the clothesline to the hook.

In the drawing, the shank 5 of the hooks is bent into a major or primary loop 6 which is continued at one of its sides into a secondary or minor loop 7 by a portion or part 8, and the loop 7 is also continued into an upcurved part 9, terminating in a rounded shoulder 10 which is continued to form a preferably vertical pin or post 11 having a boss or knob 12 on its end; thus the hook is complete in a single piece.

Figure 2:
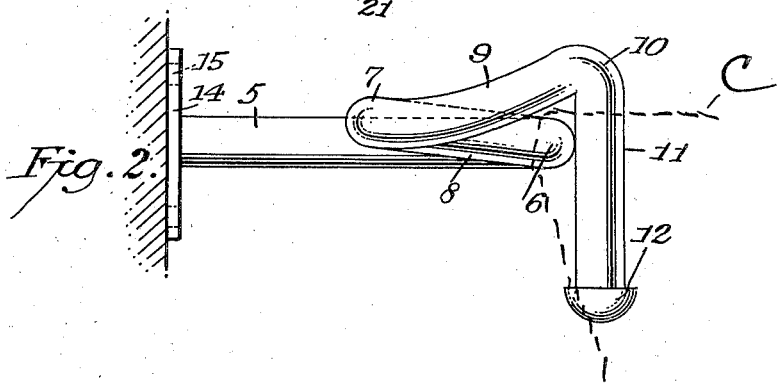
Figure 2 illustrates a side view of the hook showing a perforated plate on its shank to receive pins or screws for attaching the hook to a support.
Figures 3, 4:
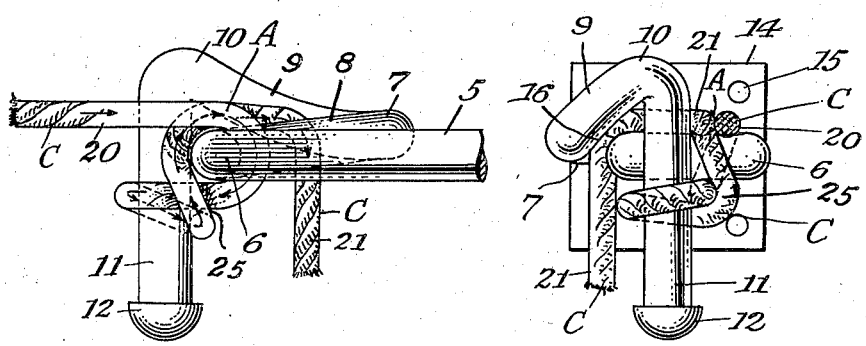
Figure 3 illustrates an outer end view of the hook.
Figure 4 illustrates a fragmentary side elevation looking from the reverse side of Fig. 2.

In Fig. 1, the shank 5 is shown with a threaded extension 13, and in Figs. 2 and 3 the shank 5 is shown as having a plate 14 provided with holes 15 for pins or bolts (not shown).

The loops 6 and 7 as shown are parallel and are substantially in a common horizontal plane. The parts 8 and 9 are formed to provide a narrow choked horizontal throat 16 (Fig. 3), narrower than the clothesline C, so that the free or loose end of the line after the hitch is made with the hook may be pinched between said parts 8 and 9 and hang down through the loop 7, as shown.

The clothesline may be quickly hitched to the hook in the following manner and as probably best shown in Fig. 4.

For the purpose of this description, the taut end of the clothesline is designated at 20 and the loose or free end at 21. All of the line now being slack, the end 21 is first dropped through the loop 6, and the end grasped by the hand and carried back and drawn tight, parallel with the upper line or end 20 of the line, after which the end 21 is coiled around the post 11 once or twice (here shown as once), and is carried up and over the first tight reach as at 25, after which said end 21 is carried up and over the outer end of the loop 6 and between the tight end 20 and the post 11, at which point both portions of the line are disposed in a relatively coincident arc over the end of the loop 6, as at A, which position serves to impart a side to side frictional gripping contact for interlocking the ends 20 and 21 of the line.

By referring to Figs. 1 and 3 of the drawing, this side frictional gripping of the line is accomplished by reason of the inner arc of the post 11 being on the longitudinal medial line M (Fig. 1) of the loop 6, for displacing the pull of the tight line 20, so that its connection with said loop will be drawn over against the loose line 21, backed up by the post 11. The end 21 of the line is finally carried over the hook and dropped into loop 7, where it may be clamped between the parts 8 and 9 forming a choked entrance into the loop 7, as described.

The arrows shown in Fig. 4 may serve as guides for threading the clothesline through or over the parts of the hook to form a desired hitch, but the windings of the line are also shown in Figs. 1 and 3 for forming an improved lock hitch formed on the clothesline hook of my invention.

In the form of construction shown, it is desirable to locate the post 11 in a position to contact the outer curved end of the major loop for bracing said post against inward strains when the line end 21 is manipulated for forming the anchoring coil or coils around it prior to passing said end up and over the end of said major loop.

As shown in dotted line, Fig. 2, the rope C may be threaded through the bracket and extended downward in engagement with the boss 12 and as the boss is relatively large, it serves to guide the rope around the post 11 when the rope is wrapped around said post.

I claim:

A single piece hook for supporting and locking clotheslines in stretches comprising a length of bendable wire forming a shank, major and minor loops substantially on a common horizontal plane, the minor loop being extended at one of its sides forming a vertically directed post having a boss at its lower end, the said post having a slight contact with the outer arc of said major loop for bracing the said post.

FREMONT H. McLAIN.